J. Childs.
Cook Stove.
Patented Dec. 17. 1834.
No. 8,531 X
BEST AVAILABLE COPY
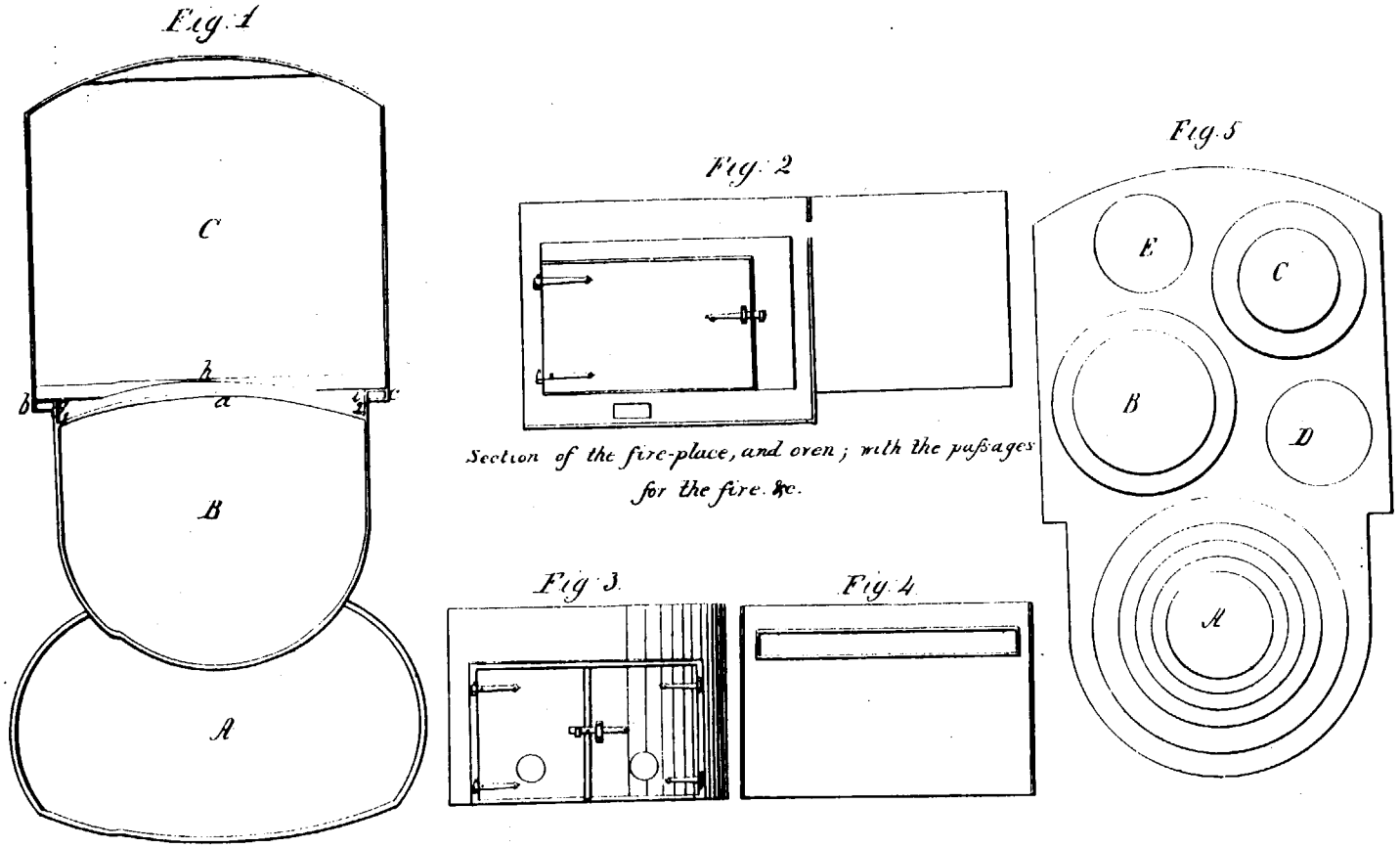
Section of the fire-place, and oven; with the passages for the fire. &c.
E. MITTER, PHOTO-LITHOGRAPHER, WASHINGTON, D. C.

Dec. 17. 1854

James Childs, of Henniker : New Hampshire.
Letters Patent.

The schedule referred to in these Letters Patent and making part of the same, con-
taining a description in the words of the said James Childs himself, of his improvement
in the Cooking Stove.

To all to whom these presents shall come - Be it known that I, James Childs
of Henniker, in the County of Merrimack, & State of New Hampshire, have inven-
ted a new and useful improvement in the Cooking Stove, and that the following
is a full and exact description of the construction and operation of the same as
improved by me. The bottom of said Stove represented by figure I, accompanying
this specification, is composed in part of an iron casting whose surface is repre-
sented by the section A. forming the hearth, and the section B. three quarters
of an inch lower than the surface of A. forming the fire-place of said Stove.
The dimensions of said casting are as follows, viz: the greater diameter of the
part A. Twenty-five and one half inches & the lesser diameter to the section B.
occupied by the fire eleven inches. The greater diameter of the part B. is nine-
teen inches, and the lesser to the extremity denoted by the double line 1 a 2. upon
Fig. 1. sixteen inches, said casting projects at each side beyond the ends of the double
line 1 a 2 about two inches and laterally one and a half inch to b & c. in the
form included within the double lines upon fig. 1.
There is then another casting extending across the extremity of the one descri-
bed from b to c, with an horizontal surface one inch wide, by which it is ri-
veted to the under side of the main casting, and a perpendicular wing two
inches wide with ears upon its lower side for supporting the remaining par
of the bottom. The remainder of the stove bottom represented upon fig. I by [illegible]
of thick sheet iron, Twenty-two inches wide and seventeen and a half inches
long exclusive of the circular projection. It is attached to the cast iron part
of the bottom, by the wing appendant to it, two inches below the surface of the
fire place. The front part and sides of the stove, as far as the cast iron bottom
extends, are also composed of iron castings as follows, viz: one a hollow cylindr
ical segment forming the front part, twelve inches high, and extending a inch each side beyond the heath of the stove. This contains two doors seven and
a quarter inches square forming a double door represented by fig. III, accompany-
ing this specification. The front part is kept in place by a slight prominence
of the edges of the top and bottom of the stove, and by an iron rod passing perpen-
dicularly through them near each end of said casting, secured by a nut and
screw at the top of the stove. The sides of the stove to the extremity of the cast iron
part of the bottom, are each an iron casting twelve inches high & twelve inches wide,
fitted to the front casting of the stove, and secured in the same manner by the
edges of the top and bottom, and by iron rods passing perpendicularly through them
at 1 and 2. fig. 1. From the extreme part of each side casting, extends a wing
of cast iron, one and a half inches wide - for enlarging the width of the remaining
part of the stove. These wings or lateral pieces have tenants at each end, fitting
mortices or grooves in the bottom and top of the stove, by which they are kept
in place. There are also ears upon the outer edges of said wings, by which the
remaining part of the sides of the stove, and the back, formed entire, are secured
These are of Russian sheet iron, twelve inches high & of a length and form
describing part C. of fig. I. from b to c.

The back has an aperture, near the middle for a funnel six inches in
diameter, and the sides, or one of them, an oven door, and a small aperture
under the oven for removing the ashes which may collect in the passage.
The oven extends across the stove twenty-two inches & is seventeen inches wide, &
eight inches high, leaving a space of two inches under it, and four inches
above, with a sufficient space behind it, for the passage of the fire to the
funnel of the stove. The oven, except the ends which are formed by the sides
of the stove, is of thick sheet iron riveted together, and to the sides, and sup
ported also by a piece of iron attached to the back part of the oven at
each corner and passing through the top of the stove, secured by a nut & screw
Between the oven and the back of the fire place, is an iron casting, nine
inches high, and extending across the stove, in the form described by the line
g h i, upon fig I. This casting is raised an inch higher than the top of the
oven, and is riveted to it, serving to protect the oven from the immediate
action of the fire, and also to increase the draught of the stove.
There is a space between the iron casting attached to the oven and the back of the fire place, represented upon fig. I, by the space between the line 1 a 2, and g h i, for the passage of fire under and above the oven of the stove to the funnel. This space is one and three quarter inches wide in the middle at h a, and about two inches at either end. The fire is admitted to it through an horizontal aperture in the back of the fire place, two inches from the top of the stove seventeen inches long, by two inches wide, and is divided upon its passage through said aperture, a part passing over the oven, and a part under it, to the funnel. The fire may, however, be made to pass entirely over the oven by means of a damper fixed at the back part of the stove. The back of the fire place is an iron casting represented by fig. IV, twelve inches high & nineteen inches long. It rests upon the extremity of the cast iron part of the bottom, in the form of a curve describing the line 1 a 2, upon fig. I, and is kept in place by the iron rods at the points marked 1 & 2, and by slight grooves or projections from the sides and top of the stove. The top of the stove is a single iron casting with a level surface & orifices for kettles and other furniture, represented by the circles upon fig. V, accompanying this specification.
It corresponds in its dimensions with the bottom exclusive of the hearth. The orifices upon the top are closed by cast iron lids with bales of wire, the larger orifices having a lid within a lid, as represented by the circles upon fig. V, for varying the size of the orifice, as convenience may require.
Your petitioner claims as an invention made by himself, and improvement in the cooking stove, the passage of the fire by a single horizontal aperture through the back of the fire place, and its equal division & draught under and over the oven, by the elevation of the cast iron back of the oven as high as the middle of said aperture, and above the top of the oven, thus making the spaces remote from the fireplace both under & above the oven larger than at the aperture, and thereby improving the draft of the stove. also the enlargement of the back part of the stove by the perpendicular wing at the bottom, and the wings at the sides, whereby a larger oven is made than in any other stove of equal size & other conveniences, and is more uniformly heated by being on a level with the fire place, allowing the fire also, to act more directly upon whatever is placed on the orifices at the top, than in any other stove. In testimony, that the above is a true Specification of my said improvement as above described I have hereunto set my hand this twenty second day of November Anno Domini one thousand eight hundred and thirty four Witnesses Sam. L. Smith Calvin Smith James Childs Drawing

[1584 10 Ds